(12) United States Patent
Sampath et al.

(10) Patent No.: US 8,688,845 B2
(45) Date of Patent: Apr. 1, 2014

(54) REMOTE COMPUTING SESSION FEATURE DIFFERENTIATION

(75) Inventors: Sriram Sampath, Redmond, WA (US); Aruna Somendra, Redmond, WA (US); Tad Brockway, Woodinville, WA (US); Jiazhi Ou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 12/163,576

(22) Filed: Jun. 27, 2008

(65) Prior Publication Data

US 2009/0327498 A1 Dec. 31, 2009

(51) Int. Cl.
*G06F 15/16* (2006.01)

(52) U.S. Cl.
USPC ............................ 709/228; 709/227; 709/229

(58) Field of Classification Search
USPC ............................ 709/227–229; 726/8, 81–86
See application file for complete search history.

(56) References Cited

U.S. PATENT DOCUMENTS

| | | | |
|---|---|---|---|
| 6,338,088 B1 * | 1/2002 | Waters et al. | 709/226 |
| 6,983,479 B1 | 1/2006 | Salas | 725/23 |
| 2004/0117358 A1 | 6/2004 | Dyrnaes et al. | 707/3 |
| 2005/0125509 A1 | 6/2005 | Ramachandran | 709/220 |
| 2006/0031226 A1 | 2/2006 | Cope et al. | 707/10 |
| 2006/0075505 A1 | 4/2006 | Murthy et al. | 726/26 |
| 2006/0200419 A1 | 9/2006 | Cook et al. | 705/59 |
| 2007/0245409 A1 * | 10/2007 | Harris et al. | 726/5 |
| 2007/0265953 A1 | 11/2007 | Cunningham et al. | 705/37 |
| 2008/0083040 A1 | 4/2008 | Dani et al. | 726/28 |
| 2009/0228982 A1 * | 9/2009 | Kobayashi | 726/26 |

OTHER PUBLICATIONS

"License Configuration in the Netcool GUI Foundation," IBM, http://publib.boulder.ibm.com/infocenter/tivihelp/v3r1/index.jsp?topic=/com.ibm.net.cool_gui.doc_1.0/admin/xF1129458201064.html, downloaded 2008, 1-3.
"Optimization of SAP®—Licenses," Honico, http://www.honico.com/content/EN/dle.html, downloaded 2008, 1-2.
"ITB SYM005 Integrated Enterprise System SAP License Review," http://64.233.183.104/search?q=cache:il8nI1O76afeJ:www.radio.state.pa.us/portal/server.pt/gateway/PTARGS_0_2_5560_416_210791_43/http%253B/pubcontent.state.pa.us/publishedcontent/publish/global/files/itbs/systems_management_itbs/sym005/itb_sym005_integrated_enterprise_system_sap_license_review.doc+SYM005+Integrated+Enterprise+System+SAP+License+Review&hl=en&ct=clnk&cd=1&gl=, Information Technology Bulletin, Commonwealth of Pennsylvania, 2005, 1-2.
"About Scapine Software Licenses," Scapine Software, http://www.seapine.com/kb/index.php?article=161, 2008, 1-2.
Burke, M., "Changes to Windows Server 2008 Terminal Servce Licensing (Part 1),", MS Terminal Serves.org, http://www.msterminalservices.org/articles/Changes-Windows-Server-2008-Terminal-Server-Licensing-Part1.html, 2007, 1-4.

* cited by examiner

*Primary Examiner* — Umar Cheema
(74) *Attorney, Agent, or Firm* — Henry Gabryjelski; Kate Drakos; Micky Minhas

(57) ABSTRACT

Example embodiments of the present disclosure are related to terminal servers. In an example embodiment a license can be associated with, or define, a set of capabilities and a session can be generated that includes the capabilities. In an example embodiment the session can be generated in view of a license and privileges that are associated with an account identifier of a user requesting a session from a terminal server.

19 Claims, 8 Drawing Sheets

REMOTE COMPUTING SESSION FEATURE DIFFERENTIATION

BACKGROUND

Remote computing systems enable users to access resources hosted by remote computers. In these systems the essential components are the client and the server. The sever in this system executes programs and transmits signals indicative of a user interface to clients that connect by sending signals over a network that can conform to a communication protocol such as the TCP/IP protocol. Each connecting client is provided a session, e.g., an execution environment that includes a set of resources. Each client can transmit signals indicative of user input to the server and the server can apply the user input to the appropriate session.

Typically, an entity such as a business or educational institution will purchase the hardware and/or software to effectuate the system and one or more licenses from a service provider. Once the system is up and running, the terminal server can be configured to receive connection requests and generate as many sessions as there are licenses. Thus, when an entity implements a remote computing system a decision need to be made as to how many concurrent users the entity wants to service.

While in most instances this scenario works well it has drawbacks. For example, the price of a license may be too high for some entities and a decision to forgo remote computing services may be made. In this situation an entity may be willing to purchase licenses at a reduced fee that are associated with reduced levels of service. Or in another situation an entity may want to purchase a lot of licenses associated with a reduced level of service and a few associated with a high level of service. Currently however administrators of the terminal servers have the power to enable or disable features as they please and a service provider can not sell licenses associated with a reduced service level (since an administrator can just change the level). Other drawbacks of the current scenario include the inability to build a business model around selling licenses directly to users and allowing them to connect to a terminal server for every day use. For example, some users may not want to deal with setting up a computer system or hiring an administrator to configure group policies for a terminal server. These users may wish to simply pay a monthly fee a certain level of service and let the service provider take care of maintaining the computer system, e.g., applying patches, installing programs, scanning for viruses, etc. In this example the user could purchase a terminal or a computer with a lightweight operating system and use the terminal server to run their programs.

SUMMARY

An example embodiment of the present disclosure describes a method. In this example, the method includes, but is not limited to determining, from a license, a service level for a terminal service session, wherein the service level defines capabilities of the terminal service session; generating a customized terminal service session in accordance with the determined service level and the determined privileges, wherein the capabilities of the service level define a maximum level of service for the session and privileges that conflict with the capabilities of the service level are overruled; transmitting draw commands for a user interface of the customized terminal service session to a client; and determining, from an account identifier, privileges associated with the account identifier. In addition to the foregoing, other aspects are described in the claims, drawings, and text forming a part of the present disclosure.

An example embodiment of the present disclosure describes a method. In this example, the method includes, but is not limited to receiving an account identifier from a network connected computer system, wherein the account identifier is associated with a license; determining, from information in the license, a service level for a terminal server session that includes peripheral redirection capabilities; generating the terminal server session, wherein the terminal server session includes a desktop environment and a peripheral redirection driver; and transmitting draw commands for a user interface of the terminal server session to the networked connected computer system. In addition to the foregoing, other aspects are described in the claims, drawings, and text forming a part of the present disclosure.

An example embodiment of the present disclosure describes a method. In this example, the method includes, but is not limited to transmitting a connection request to a networked computer system, wherein the networked computer system is configured to generate a terminal server session; transmitting an account identifier to the networked computer system, wherein the account identifier is associated with privileges; and receiving instructions to render a user interface for the terminal server session from the networked computer system, wherein the terminal server session is generated in accordance with information stored in a license that defines capabilities for the terminal server session and the privileges, further wherein the information stored in the license defines a maximum level of service for the terminal server session and privileges that conflict with the information stored in the license are overruled. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
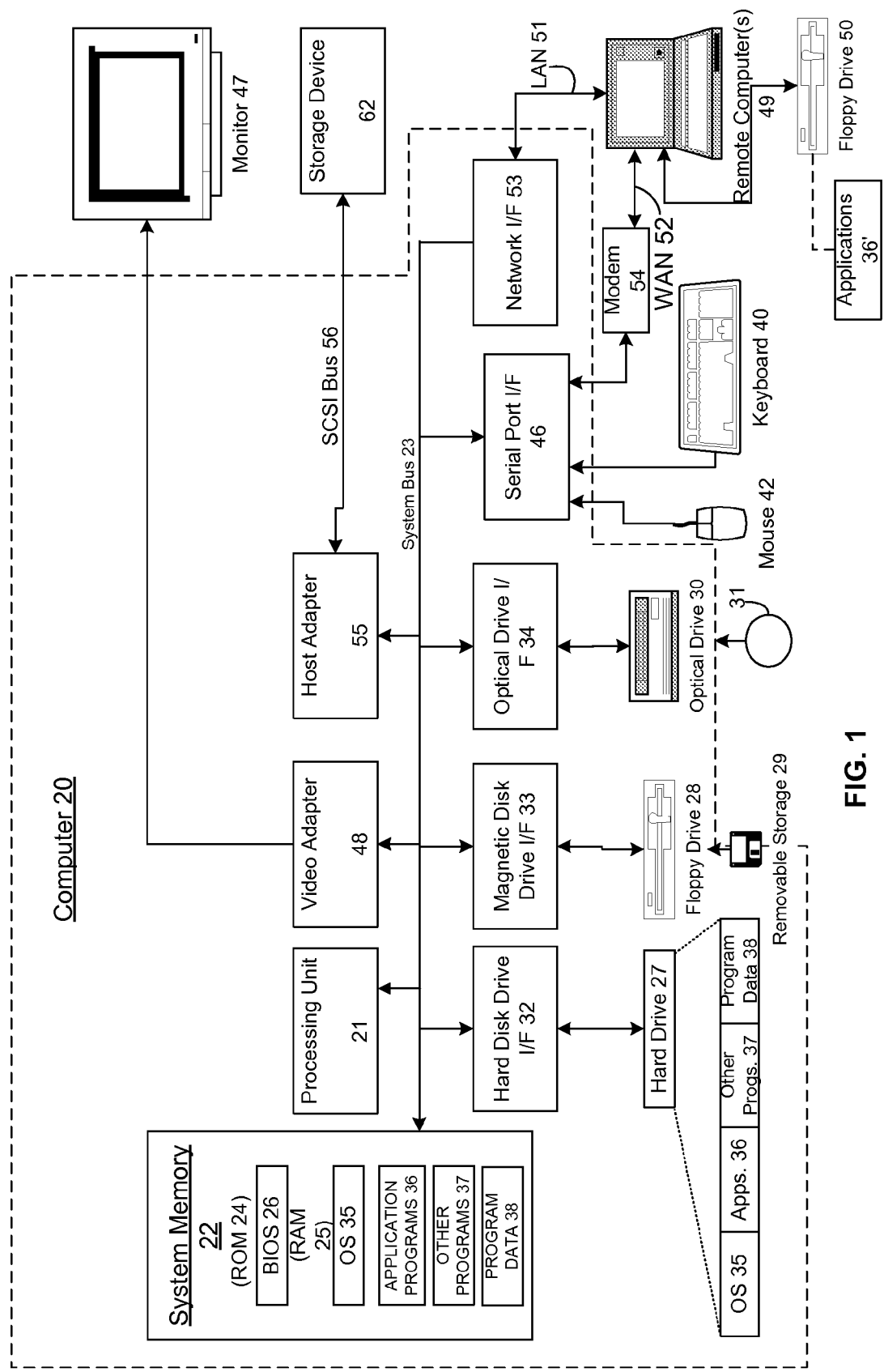
FIG. 1 depicts an example computer system wherein aspects of the present disclosure can be implemented.

Numerous embodiments of the present disclosure may execute on a computer. FIG. 1 and the following discussion is intended to provide a brief general description of a suitable computing environment in which the disclosure may be implemented. One skilled in the art can appreciate that the computer system of FIG. 1 can in some embodiments effectuate the server 204 and the client 201 of FIG. 2. In these example embodiments, the server 204 and client 201 can include some or all of the components described in FIG. 1 and in some embodiments the server 204 and client 201 can include circuitry configured to instantiate specific aspects of the present disclosure. For example, the term circuitry used through the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
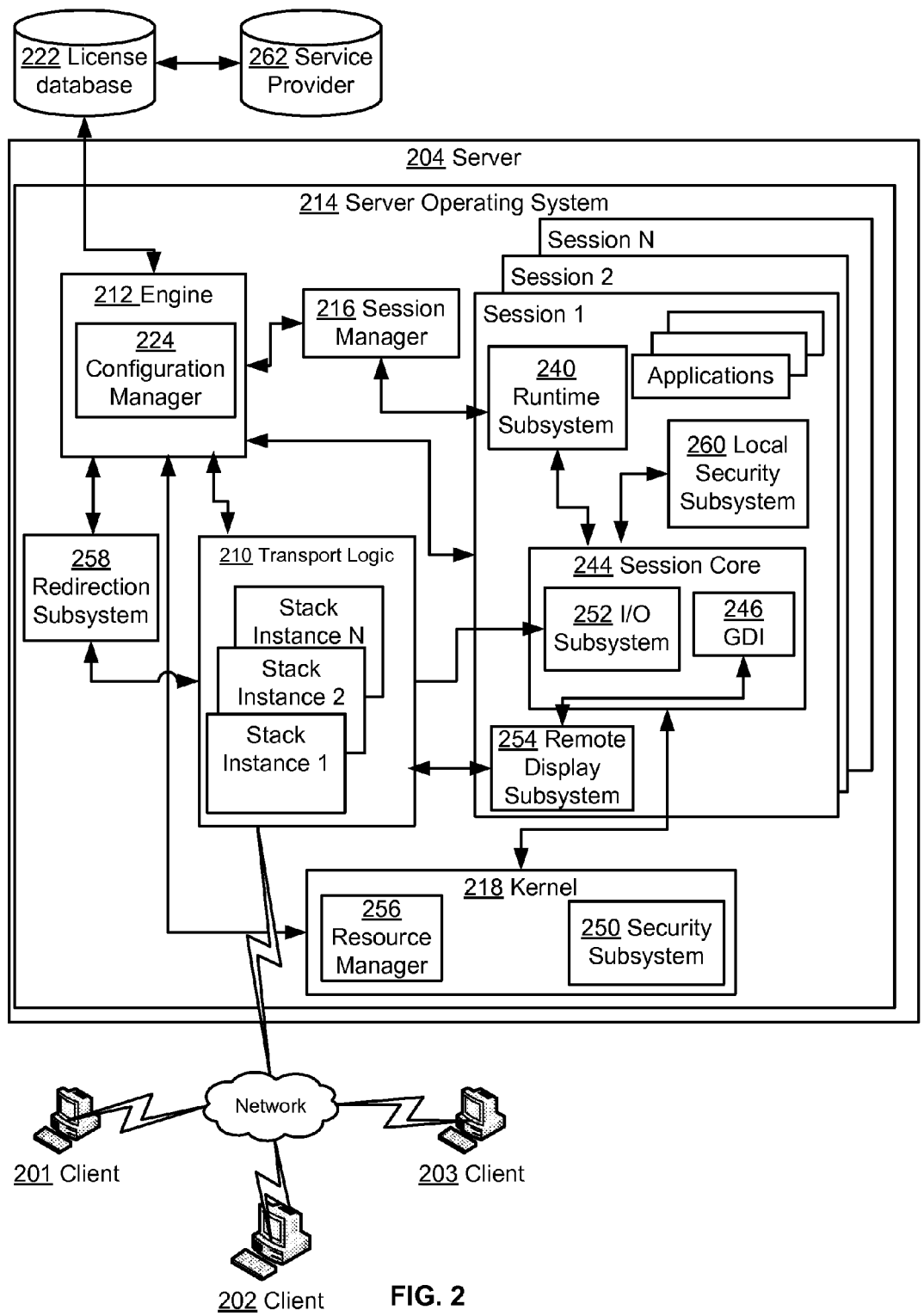
FIG. 2 depicts an operational environment for practicing aspects of the present disclosure.

Referring now to FIG. 2, it generally illustrates an example environment wherein aspects of the present disclosure can be implemented. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures of FIG. 3 through FIG. 8.

Generally, FIG. 2 depicts a high level overview of a terminal server environment that can be configured to include aspects of the present disclosure. In reference to the figure, a server 204 is depicted that can include circuitry configured to effectuate a terminal server and for example, three example clients 201, 202, and 203 (while three clients are depicted the server 204 in embodiments can service more or less clients). The example clients 201-203 can include computer terminals effectuated by hardware configured to direct user input to the server 204 and display user interface information generated by the server 204. In other embodiments, clients 201-203 can be computers that include similar elements as those of computer 20 FIG. 1. In these example embodiments, clients 201-203 can include circuitry configured to effect operating systems and circuitry configured to emulate the functionality of terminals. In these examples one skilled in the art can appreciate that the circuitry configured to effectuate the operating systems can also include the circuitry configured to emulate terminals.

In the depicted example, the server 204 can be configured to generate one or more sessions for connecting clients 201, 202, and 203 such as sessions 1 through N (where N is an integer greater than 1). Briefly, a session in example embodiments of the present disclosure can generally include an operational environment that is effectuated by a plurality of subsystems, e.g., software code, that are configured to effectuate an execution environment and interact with a kernel 218 an operating system 214. For example, a session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. The session in this example can include similar subsystems as the session described above. Generally, a session can be generated by the server 204 on a user by user basis when, for example, the server 204 receives a connection request over a network connection from a client such as client 201. Generally, a connection request can first be handled by the transport logic 210 that can, for example, be effectuated by circuitry of the server 204. The transport logic 210 can in some embodiments include a network adaptor, firmware, and software that can be configured to listen for connection messages and forward them to the engine 212. As illustrated by FIG. 2, when sessions are generated the transport logic 210 can include protocol stack instances for each session. Generally, each protocol stack instance can be configured to route user interface output to an associated client and route user input received from the associated client to the appropriate session core 244.

As depicted by FIG. 2, during the session generation process the engine 212 can be configured to obtain a license for the session. For example, in one example embodiment the engine 212 can receive a license from the client 201 during the session generation process. In other example embodiments the engine 212 can receive a copy of a license from a license database 222. In some embodiments of the present disclosure the license database 222 can include a relational database management program that can be executed on an operating system of a computer such as computer 20 of FIG. 1. In an example embodiment that includes a license database 222, it can store one or more licenses that can be checked out when a client attempts to obtain a session from the server 204. In another embodiment each license can itself be associated with an account identifier, e.g., a username/password combination, a smartcard identifier, etc., and each license can only be checked out if the correct account identifier is presented. Generally, the number of connections that a server 204 can generate can be dependent upon the number of licensees the entity that controls the server 204 has purchased from a service provider. If for example, the entity has purchased one license, then the server 204 can be configured to only allow one session. In this example if the license is associated with an account identifier, then only a user that presents the correct account identifier can obtain a session.

In example embodiments of the present disclosure each license can be validated by a service provider 262 before they can be used. For example, the service provider 262 can in example embodiments act as a certificate authority that aphorizes and activates licenses and servers. In these embodiments the service provider 262 can ensure that licenses are not stolen, copied, or pirated. The service provider 262 can also ensure that the license are only used by the server 204 they are purchased for by storing a copy of the licenses in a database and associating the licenses with server 204.

As illustrated by FIG. 2, a configuration manager 224 in an example embodiment of the present disclosure can include computer readable instructions that when executed instantiate a process that can receive a license during the session creation process and determine a service level for a newly spawned session by interfacing with various subsystems such as session manager 216. The session manager 216 in an embodiment can be configured to initialize and manage each session by for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can be configured to expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies of the server 204 by, for example, performing runtime object protection. In these embodiments the resource manager 256 in an embodiment can create and terminate processes and threads in response to requests from the runtime subsystem 240. More specifically, in an embodiment the runtime subsystem 240 can request the execution of threads and the session core 244 can send requests to the executive of the kernel 218 to allocate memory for the threads and schedule time for them to be executed.

Continuing with the description of FIG. 2, in an embodiment the session core 244 can include a graphics display interface 246 (GDI) and an input subsystem 252. The input subsystem 252 in an example embodiment can be configured to receive user input from a client 201 via the protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and processed by the GDI 246. The GDI 246 in general can include a process that can generate graphical object draw commands. The GDI 246 in this example embodiment can be configured to pass the commands to the remote display subsystem 254 that can instantiate a display driver for the session. In an example embodiment the remote display subsystem 254 can be configured to include virtual display driver(s) that may not be associated with displays physically attacked to the server 204, e.g., the server 204 could be running headless. The virtual display driver in this embodiment can be configured to receive the draw commands and transmit them to the client 201 via a stack instance associated with the session.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various operational procedures.

Figure 3:
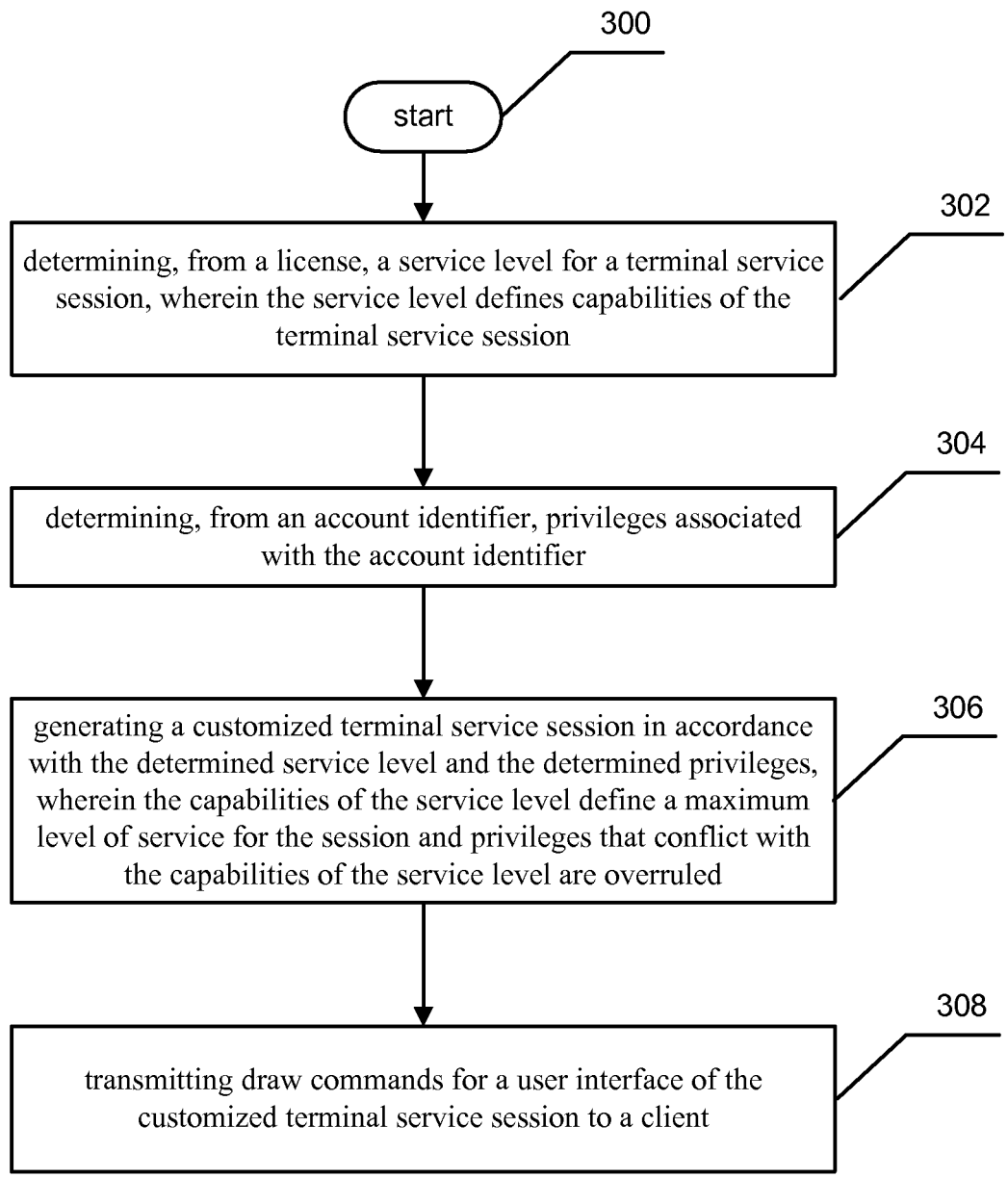
FIG. 3 depicts a flowchart depicting operational procedures for a remote computing method.

Referring now to FIG. 3, it depicts an operational procedure including operations 300, 302, 304, 306, and 308. Operation 300 begins the operational procedure, and operation 302 illustrates determining, from a license, a service level for a terminal service session, wherein the service level defines capabilities of the terminal service session. For example, and referring to FIG. 1 and FIG. 2, a configuration manager 224 of an engine 212 can in this example be configured to determine a service level for a session from a license. For example, in an embodiment of the present disclosure the license can contain a set of capabilities and the engine 212 can build a customized session for a client such as client 201 from the information. In another example embodiment the license can be associated with capabilities and the configuration manager 224 can be configured to look up a set of capabilities for the session in a table when a license is received.

In either embodiment the license can include, or be associated with, schematized information that defines the capabilities for sessions. For example, in an embodiment the configuration manager 224 can include a parser and the license could be a file written in XML. The XML file in this example could define capabilities for a service level by including a list configuration settings for various subsystems. For example, a license can include an attribute related to setting a hardware resource level for the session and a value corresponding to the attribute such as a 1 or 0. In this or other example embodiments the attribute can included additional nested attributes that further configure hardware recourses like 'CPU time', and/or 'RAM usage'. These additional nested attributes could in some embodiments be associated with specific resource requirements, or the attributes could be associated with a value such as 'low', 'medium', or 'high'. In this or other example embodiments the license may include an attribute such as license type along with a value such as 'bronze', 'silver', 'gold', or 'platinum'. In this example, each license type can be associated with a different set of capabilities and the engine 212 can include a table that defines the capabilities associated with each license type.

In another embodiment the license can include unstructured data, e.g. a blob. In this example embodiment, a set of features can be grouped together into a fixed service level such as 'bronze', 'silver', 'gold', or 'platinum' service levels. The ordering of the bits can be indicative of what level the license is associated with. In this example, each ordering can be associated with a different set of capabilities and the configuration manager 224 can include a table that defines the capabilities associated with the order of bits.

During the session generation process the engine 212 can obtain the license from, for example, a database or the client. For example, in an embodiment the license can be stored in a license database 222 and associated with an account identifier such as a smartcard. In this example embodiment the session manager 216 can be configured to generate a session; initiate a logon process; and send signals to subsystems that support a basic terminal service session, e.g., a basic display driver, transport logic 210, etc. A user interface indicative of the logon process can be generated transmitted to the client 201 and an account identifier can be received. In this example the transport logic 210 can pass a copy of the account identifier to the engine 212 and the engine 212 can pass the account identifier to a license database 222. The license database 222 can in this example be configured to determine which license is associated with the account identifier and transmit a copy of the license to the engine 212. In another example embodiment a client such as client 201 can be configured to store a copy of the license and transmit a copy of the license to the server 204 during, for example, the initial connection request. In this embodiment the client 201 can store a license that can be encrypted using public key cryptography techniques. In this example the client 201 can transmit a copy of the license to the transport logic 210 which can be configured to forward the license to the engine 212. The engine 212 can then in this example decrypt the license using a private key for example.

In an example embodiment a service level can be defined by a lack of license associated with a request for a session. For example, in this embodiment the configuration manager 224 of FIG. 2 can be configured to generate a session that includes reduced capabilities when a determination that the session lacks a license is made. Generally, in a business deployment setting, an administrator can have access to the server 204 in order to perform maintenance and to install/update applications. In an embodiment administrators can be allowed to start administrator sessions that do not consume licenses in order to perform administrative tasks. In this embodiment if the configuration manager 224 receives a request to generate a session and a license is not associated with the session request, the configuration manager 224 can be configured to load a stripped down session that has fewer capabilities, e.g., the screen resolution may be set at a fixed low level, certain drivers may not be instantiated, and others may be instantiated in their place, registry settings may be locked, and processes associated with the session space may be configured to have a lower priority level. In this embodiment, businesses and the like will not be tempted to use the administration session to perform day to day activities in order to avoid paying a licensing fee since the user experience will be diminished.

Continuing with the description of FIG. 3, it additionally illustrates operation 304 that depicts determining, from an account identifier, privileges associated with the account identifier. For example and in addition to the previous example, a set of privileges can be determined for the session. In an embodiment a privilege can be a right to perform an action on a resource of the server 204. For example, a privilege can be how long an idle session will remain connected, the maximum color depth for a session, e.g., 24-bit color, clipboard redirection, e.g., whether data stored in a clipboard on the client 201 will be transmitted to the server 204 so that a user can cut and paste from a client desktop to the desktop associated with their session, application security, peripheral device redirection, etc. In the same, and other embodiments a privilege can be related to whether the user can modify resources of the server such as by creating a file, deleting a file, opening a file, starting an application, accessing an internal network, accessing an external network, creating a user group, mounting a volume, customizing a user interface, etc. In this example privileges can be associated with an account identifier that can be obtained during a session generation process. For example, privileges can be stored in a policy file that can be used to set registry settings and generate an access token that encapsulates access rights of a user. The policy file in an example embodiment can be associated with an account identifier that can obtained during a logon process. For example, when a logon process is initialized the session manager 216 can instantiate a basic set of processes that can effectuate a logon process and, for example, a local security subsystem 260. The local security subsystem 260 can receive an account identifier during a logon process and search a database for the username/password to determine whether the account identifier is valid. In the instance that the combination is valid the local security subsystem 260 can search a policy database that stores policy files that identify registry settings associated with account identifiers and access rights. Once the policy file is obtained the local security subsystem 260 can interface with the configuration manager 224 to determine whether any of the privileges should be modified in view of information in the license.

Continuing with the description of FIG. 3, it additionally depicts operation 308 that illustrates generating a customized terminal service session in accordance with the determined service level and the determined privileges, wherein the capabilities of the service level define a maximum level of service for the session and privileges that conflict with the capabilities of the service level are overruled. For example and continuing with the example described above, the configuration manager 224 of FIG. 2 can be configured to generate a session that includes the capabilities defined by information associated with, or stored in, the license and the privileges associated with the account identifier. As depicted by FIG. 2 the session can be generated by the engine 212 in accordance with support from various subsystems that effectuate different capabilities of the session. In order to generate a customized session with a specific set of capabilities different subsystems of the server 204 can be configured by the engine 212. For example, the configuration manager 224 in an embodiment can include an application program interface that can be accessible to the various subsystems that support the terminal server, e.g., resource manager 256, security subsystem 250, local security subsystem 260, remote display subsystem 254, and/or redirection subsystem 258. In this example, the subcomponents can receive a signal that indicates that a new session is being generated and connect to the configuration manager 224. In this example each subsystem can be configured to determine how they are to affect the session. The subsystems can then perform operations to customize the session. In another specific example the engine 212 can be configured to send configuration messages to each subsystem that supports terminal server sessions. In this example, the configuration manager 224 can be configured to generate configuration signals for each subsystem and transmit the signals to APIs of the subsystems. Each subsystem can be configured to receive the configuration information and perform operations to customize the session.

In an example embodiment the capabilities of the session can define a maximum level of rights and if privileges provide greater rights then they can be overruled by the configuration manager 224. In this example, the license can be thought of as setting a maximum service level that can be scaled back by configuring privileges. In this example, if a right defined in the policy file is broader than a similar right in a license the session can be generated with the right defined in the license. If on the other hand a right defined in the policy file is narrower than a similar right in the license, the session can be generated with the right defined by the policy file. In this embodiment, the service provider 262 can use the license to control how the server 204 is used, e.g., if an entity purchases a 'bronze' license an administrator can not configure the server 204 to provide 'platinum' services. For example, different license types may have different price points depending on the capabilities associated with them.

In a specific example a license can include information that defines a service level that includes printer redirection, e.g., this could be for example information that indicates that the license is a 'gold' level license, or the information in the license could include an attribute such as 'printer redirection=1' which could logically denote to the configuration manager 224 and/or the redirecting subsystem 258 that printer redirection is enabled for this session. In another example different levels of granularity could exist for a capability such as printer redirection. For example, in an embodiment the basic level of service could include printer redirection for only specific printers, e.g., printers having drivers stored on the server 204, and an attribute such as 'printer redirection=1' could logically denote that enhanced printer redirection is enabled, e.g., printer redirection for any printer effectuated by special drivers that can convert print commands into one or more formats acceptable by most printers. In this example, the configuration manager 224 can transmit a notification to the redirection subsystem 258 that indicates that a session is being generated. The configuration manager 224 in this example could determine that printer redirection is enabled from the license and store configuration information for the redirection subsystem 258 in a table. In this example the redirection subsystem 258 can receive the notification from the configuration manager 224 and access the table via an API. The redirection subsystem 258 can receive information that directs it to enable printer redirection for the session identifier associated with the newly generated session and access a table of information in the stack instance associated with the newly formed session to identify a printer type associated with the client 201.

Continuing with the description of FIG. 3, it additionally depicts operation 308 that illustrates transmitting draw commands for a user interface of the customized terminal service session to a client. In an example embodiment of the present disclosure after a customized session is generated by the engine 212 a signal indicative of the user interface for the session can be generated by the GDI 246 and transmitted to the remote display subsystem 254. In this example the GDI 246 can be configured to format commands to draw images for the session into commands supported by a display driver of the remote display subsystem 254. The remote display subsystem 254 can then be configured to transmit the commands to the client 201 via the appropriate protocol stack instance of the transport logic 210.

Figure 4:
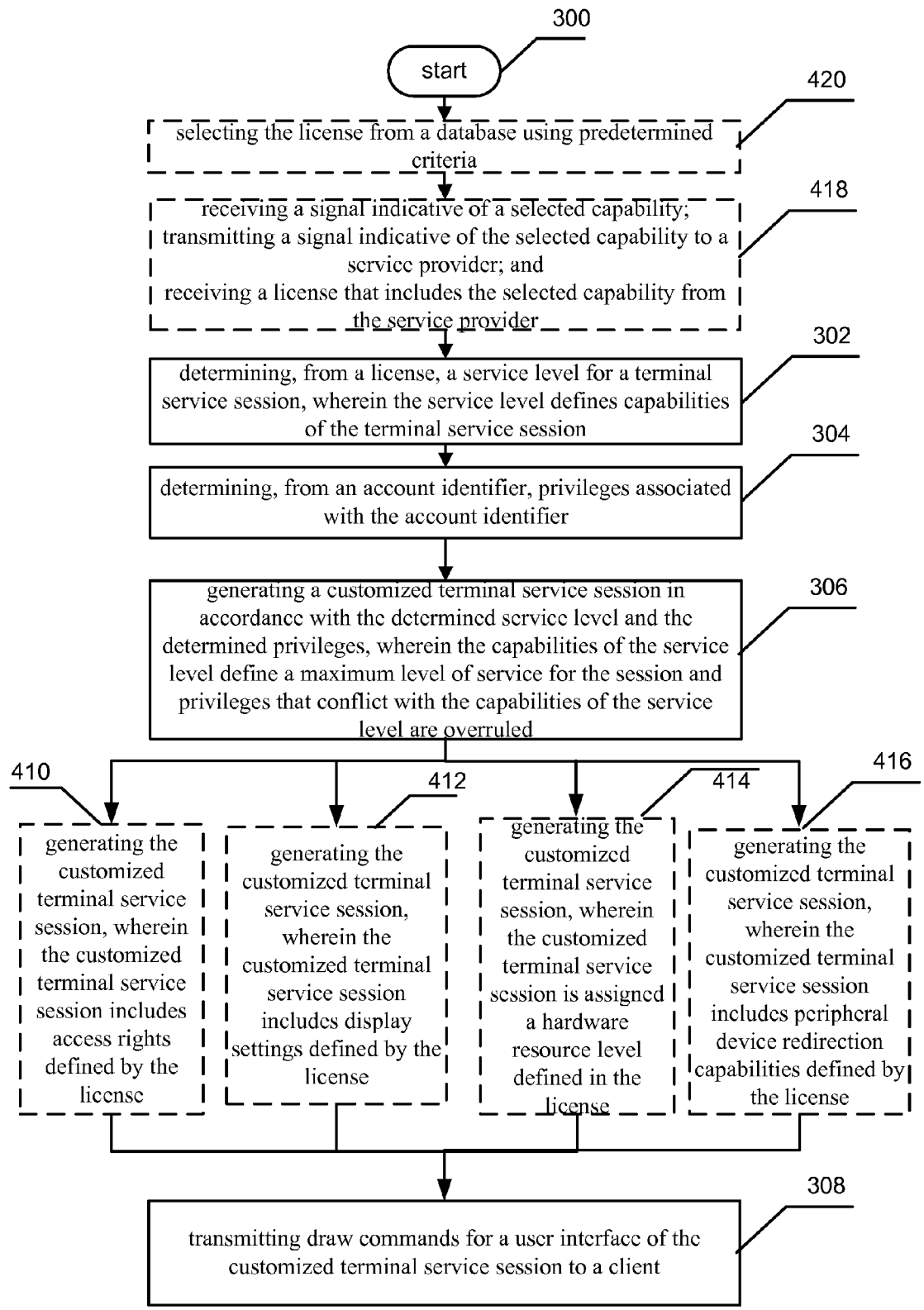
FIG. 4 depicts an alternative embodiment of the operational flowchart of FIG. 3.

Referring now to FIG. 4, it depicts additional optional operational procedures 410, 412, 414, 416, 418 and 420. Referring now to operation 410, it depicts generating the customized terminal service session, wherein the customized terminal service session includes access rights defined by the license. For example, in an embodiment of the present disclosure the license can include access rights for applications, files, registry settings, user preferences, and other resources of the server 204. For example, in an embodiment of the disclosure access rights can be enforced by a security subsystem 250 of the server 204 by checking information in tokens against access control lists associated with the resources. For example, when a process or thread of a session attempts to gain access, e.g., open, close, delete, and/or modify an object, e.g., a file, setting, or an application, the thread or process can be authenticated by the security subsystem 250 of the kernel 218. Generally, a thread is authenticated by presenting a token that includes the permissions of the user. The security subsystem 250 can check the token against an access control list associated with the object and determine whether the thread has permission based on a comparison of information in the token and the access control list. If the security subsystem 250 determines that the thread is authorized then the thread can be allowed to access the object.

In an example embodiment the token can be built from information in the license and information associated with the account identifier. For example, an account identifier can be obtained during a logon process and the local security subsystem 260 can be configured to determine the privileges that an administrator has assigned to the account identifier from a policy file. Once the local security subsystem 260 receives a copy of a policy file it can interface with the configuration manager 224 to merge the access rights associated with the license and the access rights associated with the policy file.

Continuing with the example, in one embodiment the local security subsystem 260 can interface with the configuration manager 224 to merge the access rights in the copy of the policy file with the license information, e.g., either configuration manager 224 can provide the information to the local security subsystem 260 or the local security subsystem 260 can provide the information to the configuration manager 224. In an example embedment, the local security subsystem 260 can receive a message from the configuration manager 224 that includes configuration parameters from the license. The local security subsystem 260 can in this example step through each access right associated with, or stored in the license and determine whether to modify the information in the copy of the policy file. For example, the local security subsystem 260 can be configured to determine whether each access right in the license is broader than access rights in the copy of the policy file, if an access right in the license is broader than an access right in the copy of the policy file then the access right in the copy of the policy file can be used. If the access right in the license is narrower than the access right in the copy of the policy file, then the copy of the policy file can be modified to include the access right defined by the license. Once the policy file is modified, a copy of its information can be transmitted to the security subsystem 250 to generate a token that encapsulates the access rights of the session. A specific example may include a local security subsystem 260 that receives information from a user profile that indicates that the user has unrestricted access to an internet browser and denies access to every other application stored on server 204. The local security subsystem 260 can instantiate a copy of the policy file that includes an explicit enable for the internet browser and an explicit deny for every other application. The local security subsystem 260 can then access or receive information associated with the license and compare the license information to the copy of the policy file. In this example, the information received from the configuration manager 224 may include a setting for the internet browser that restricts the ability to view certain pages and information that defines that all other applications are available. In this example the local security subsystem 260 can be configured to determine that the browser right in the copy of the policy file is broader than what is allowed by the license and change the right in the copy of the policy file. Since in this example all other applications are denied by both the license and the privileges those rights can remain unchanged. Once the copy of the policy file is updated the local security subsystem 260 can transmit a message the includes the information to the security subsystem 250 so that it can create an access token that encapsulates the set of access rights for the user. After the access token is created, the token can be passed to the local security subsystem 260 and subsequent access rights requested by processes and threads of the session can use the access token to gain access to the resources of the server 204.

In an alternative embodiment the merging operating can be performed by the security subsystem 250 of the kernel 218. For example, the local security subsystem 260 can be configured to send the copy of the policy file to the security subsystem 250. In this example, the security subsystem 250 of the kernel 218 can receive the copy of the policy file and information from the configuration manager 224 that identifies access rights associated with the license. Once the copy of the policy file is updated the security subsystem 250 can be configured to create an access token that encapsulates the set of access rights for the user. After the access token is created, a copy of the token can be passed to the local security subsystem 260 and subsequent access rights requested by processes and threads of the session can use the access token to gain access to the resources of the server 204.

In a specific example the license can define a 'gold' level of service that configures the session to have the capability to access all the applications stored on the server 204. In this example embodiment however an administrator of a company may want to prevent the user from accessing a database management program and has configured the user's access control rights to reflect this desire. In this example embodiment, the user may attempt to access the database management program and the security subsystem can be configured to interrogate the token. Based on the administrator's policy however the access token was generated to deny access to the database management program since this right is narrower than the rights defined in the license. In this example the security subsystem can then be configured to compare the information in the token to the access control list associated with the database management program. In this example, the token may have insufficient access rights to the database management program and the security subsystem can be configured to deny the request.

Continuing with the description of FIG. 4, it additionally depicts operation 412 that illustrates generating the customized terminal service session, wherein the customized terminal service session includes display settings defined by the license. For example, in an embodiment of the present disclosure the license can include information that identifies configuration parameters for a display driver attached to the session. For example, when a session is generated a display driver can be loaded in the session that can redirect graphics to the client 201 associate with the session. In this example, the configuration manager 224 can send a signal to the remote display subsystem 254 during the session generation process directing it to load a display driver that has certain characteristics. For example, since a user of the client 201 will interact with the session by viewing an image of the session, the user experience can be enhanced by loading display drivers that have different visual features enabled. For example, in an embodiment the license can set a maximum display resolution for the session such as 800 by 600 pixels for a 'silver' license or 1280 by 1024 pixels for a 'gold' license. In this example a session associated with a 'gold' license will have more screen real estate than a session associated with a 'silver' license. In another example embodiment the license can identify color quality, e.g., 32 bit color or 16 bit color. In this example a session associated with a 'gold' license will have more and deeper colors than a session associated with a 'silver' license. In yet another example embodiment a license may indicate a level of service that includes a user interface that had features that are intended to be aesthetically pleasing, e.g., the user interface can include graphic translucency effects, etc. For example, in this example a display driver can be loaded that has such aesthetically pleasing features enabled.

Continuing with the description of FIG. 4, it additionally depicts operation 414 that illustrates generating the customized terminal service session, wherein the customized terminal service session is assigned a hardware resource level defined in the license. For example, in an embodiment of the present disclosure the license can include information that identifies a hardware resource level for the session. In this example embodiment the configuration manager 224 can determine an amount of system resources for the session and communicate the information to a resource manager 256 of the kernel 218 and/or the session manager 216 depending on what subsystem is called to set the resource level associated with the license, e.g., the resource manager 256 can receive information to prioritize threads whereas the session manager 216 can receive information to assign memory address to the session. In an example embodiment the hardware resources can include a size of real and/or virtual memory that is reserved for the session space. In this example the configuration manager 224 can send information that defines a memory size to the session manager 216 and the session manager 216 can be configured to generate a session that includes a certain amount of virtual memory and/or real memory. In another example embodiment the hardware resource level can define a priority level for processing threads associated with the session space. In yet another example embodiment the hardware resource level can be associated with a level of priority related to access to hardware components of the server 204 such as hard disks, CD-ROMs, floppy disk drives, serial ports, and parallel ports, and/or priority access to the registry, the paging file, system services, and other global objects and resources.

In an embodiment the resource manager 256 can be configured by the configuration manager 224 to adjust the priority levels of threads that are associated with a certain session space so that a session associated with a 'premium level' license so that its threads can have a higher priority than those of other sessions. For example, when the session is generated the configuration manager 224 can identify a priority level associated with the license and send a message to the resource manager 256 of the server 204. The resource manager 256 can store a table that identifies the session identifier and a service level. The operating system 214 in this example can include a priority driven scheduler that can have access to the table. In the event that a thread associated with a session identifier stored in the table sets a ready flag the scheduler can preempt execution of a thread if the executing thread has a lower priority level.

In another example embodiment of the present disclosure the configuration manager 224 can be configured to receive a license that sets a restriction on the number of user space applications that can be executed in the session space of the session. In this example embodiment the configuration manager 224 can send a signal to the resource manager 256 to only instantiate a certain number of processes for the session. For example, in an embodiment of the present disclosure a license may indicate a certain level of service by including an attribute such as 'application=3'. In this example embodiment, the attribute application can indicate that sessions associated with this license can only allow the user to execute 3 user space applications at a given time. The configuration manager 224 in this example can communicate this information to the resource manager 256 where it can be stored in a table that identifies the maximum number of applications that can concurrently execute and the number of user space applications that are executing in the session space of the session. When a request is received to generate a process for a user space application, the resource manager 256 can check the table to determine whether the maximum level has been reached. In the instance that the maximum level is reached the resource manager 256 can generate an error message that can be transmitted to the client 201, otherwise the resource manager 256 can execute a process for the user space application.

In another example embodiment of the present disclosure the configuration manager 224 can transmit a signal that sets the restriction level for applications to the runtime subsystem 240. The runtime subsystem 240 in this example can be configured to store the information in a table that identifies the maximum number of applications that can concurrently execute and list the number of user space applications that are executing in the session space of the session. When a request is received to generate a process for a user space application, the runtime subsystem 240 can check the table to determine whether the maximum level has been reached. In the instance that the maximum level is reached the runtime subsystem 240 can generate an error message that can be transmitted to the client 201, otherwise the runtime subsystem 240 can submit a request to generate a process for the application to the resource manager 256 of the kernel 218.

Continuing with the description of FIG. 4, it additionally depicts operation 416 that illustrates generating the customized terminal service session, wherein the customized terminal service session includes peripheral device redirection capabilities defined by the license. For example, in an embodiment of the present disclosure the license can include information that enables device redirecting. In this example the configuration manager 224 can be configured to instantiate one or more device redirecting drivers for the session and registry settings that enable device redirecting can be transmitted to the session core 244. The session core 244 in this example can detect the redirecting drivers and determine that the peripheral devices are connected to the server, e.g., the redirecting drivers can emulate the presence of peripherals. The session core 244 can then in this example generate a graphical representation of the emulated peripheral in the desktop environment. In this example, if a user manipulates the graphical representation of the emulated peripheral, the session core 244 can send an access request to the redirecting drivers. The redirecting drivers can receive the request and format a message, e.g., one or more packets of information, for the peripheral device of the client 201 and send it to the client 201 via the transport logic 210.

In an example embodiment the peripheral devices can include, but are not limited to mp3 players, local drives, digital cameras, printers, at the like. In this example embodiment when the client 201 requests a session it can transmit a list that identifies the physically attached peripheral devices to the server 204. In this example embodiment the engine 212 can receive the list and the configuration manager 224 can determine whether the license enables peripheral device redirection and/or determine whether the license allows for the peripheral devices in the table to be redirected. In an embodiment peripheral device redirection for all supported peripheral devices can be enabled or disabled together, e.g., one attribute in or associated with the license could enable/disable all peripheral devices, or in other embodiments different levels of service may enable device redirection for different types of devices, e.g., mp3 player may be enabled for 'gold' licenses or above. For example, a 'silver' license can be processed by the configuration manager 224 and a determination can be made to enable printing redirection and local drive redirection, however plug and play support for an mp3 play may be disabled. In this example, the configuration manager 224 can determine from the client 201 that a printer is connected to the client and an mp3 play is also connected. The configuration manager 224 can send a signal to the redirection subsystem 258 that directs it to load a redirection driver for the printer and the hard drive. Once the drivers are instantiated, a user of the client 201 can use the functionality of the hard drive and printer connected to the client 201. In a specific example the session can include a printer redirecting driver. The user can view a word document and select a print command. The session core 244 can receive the request and route the command to the redirecting driver that is emulating a printer. The redirecting driver can intercept the print command and route the command to the transport logic 210. The transport logic 210 can transmit the command to the client 201 where client side code can format the command so that the printer attached to the client 201 can interpret it and send it to the printer.

Referring now to 418, it illustrates receiving a signal indicative of a selected capability; transmitting a signal indicative of the selected capability to a service provider; and receiving a license that includes the selected capability from the service provider. In an example embodiment of the present disclosure a client 201 can receive images from the server 204; draw the images to a bitmap; and render the images on a display that depict one or more capabilities with associated text and a user can select one or more of the capabilities on the display. A signal can be sent to the server 204 that identifies that the user would like a session that includes the capability and a license can be generated for the user by a service provider 262. Once the license is generated, the client 201 can obtain a session from the server 204 that includes the capability. In an embodiment of the present disclosure a business model can be implemented that allows users to select features and a license can be custom built that is priced to reflect the included features.

For example, in one example implementation a session manager 216 can receive a request to generate a session and a process can be instantiated that includes a series of forms listing different capabilities such as plug and play redirection purchasing options, hardware resource level purchasing options, user interface purchasing options, application suite purchasing options, etc. A user interface indicative of the form can then be transmitted to the client 201 than can for example, be depicted alongside the logon screen. The user can either logon using a previously obtained account identifier, or the user can input information about the features they would like to have in there session. After the user has selected one or more features, or alternatively selected a package of features such as a 'silver' package a price total for the license can be presented to the user. In this example the user could for example, enter a credit card number or the like and submit the form. The client 201 can be configured to encrypt the credit card number and the package and transmit a signal to the server 204, or a transaction server that is operatively coupled to the license database 222 (not shown). In this example embodiment the server 204 or the transaction server can include functionality to handle credit card authentication and a packet indicative of the service level can be sent to the service provider 262. In this example the service provider 262 can generate a customized license based on the requested service level and transmit a copy of the license to either the client 201 or the server 204 and a signal can be transmitted back to the client 201 that identifies that the transaction was successful and the license is associated with a specific account identifier. In this example the user can then enter the account identifier into the logon screen and a customized session can be loaded for the user.

Continuing with the description of FIG. 4, it additionally depicts operation 420 that illustrates selecting the license from a database using predetermined criteria. For example, in an embodiment of the present disclosure a license can be selected by the engine 212 based on predetermined criteria such as time of day, day of the week, amount of licenses that can be checked out of the license database 222, amount of sessions currently being maintained, types of licenses available, etc. For example, in an embodiment of the present disclosure a user's experience may change depending on what license is used when they obtain a session. For example, in an embodiment an entity may only purchase one or two 'platinum' level licenses from the service provider 262 that enable, for example, access to movies stored on the server 204. If a user logs on during a busy time they may not be able to check out the 'platinum' level license and would not be able to view movies during their session. In another example, the license database 222 can include a plurality of 'platinum' level licenses, however in this example the licenses may only be checked out on weekends and/or after a certain time of day, e.g., after work hours. In this example a user logging on during business hours may only have access to a license that enables access to resources associated with work. In this example embodiment the engine 212 can maintain a table that identifies different predetermined criterion and the types of licenses that can be made available if such criterion exist. For example, the engine 212 can receive a request to generate a session. In this example the engine 212 may access the license database 222 and determine that the account identifier associated with the request is associated with a 'platinum' level license. The engine 212 can then request a platinum license from the license database 222. If however a 'platinum' level license is not available, e.g., they are all checked out by other people that are associated with 'platinum' level licenses, the engine 212 can obtain a 'gold' license instead and use it to build a session or send a message to the client 201 that states that a 'platinum' license is not available at the moment.

Figure 5:
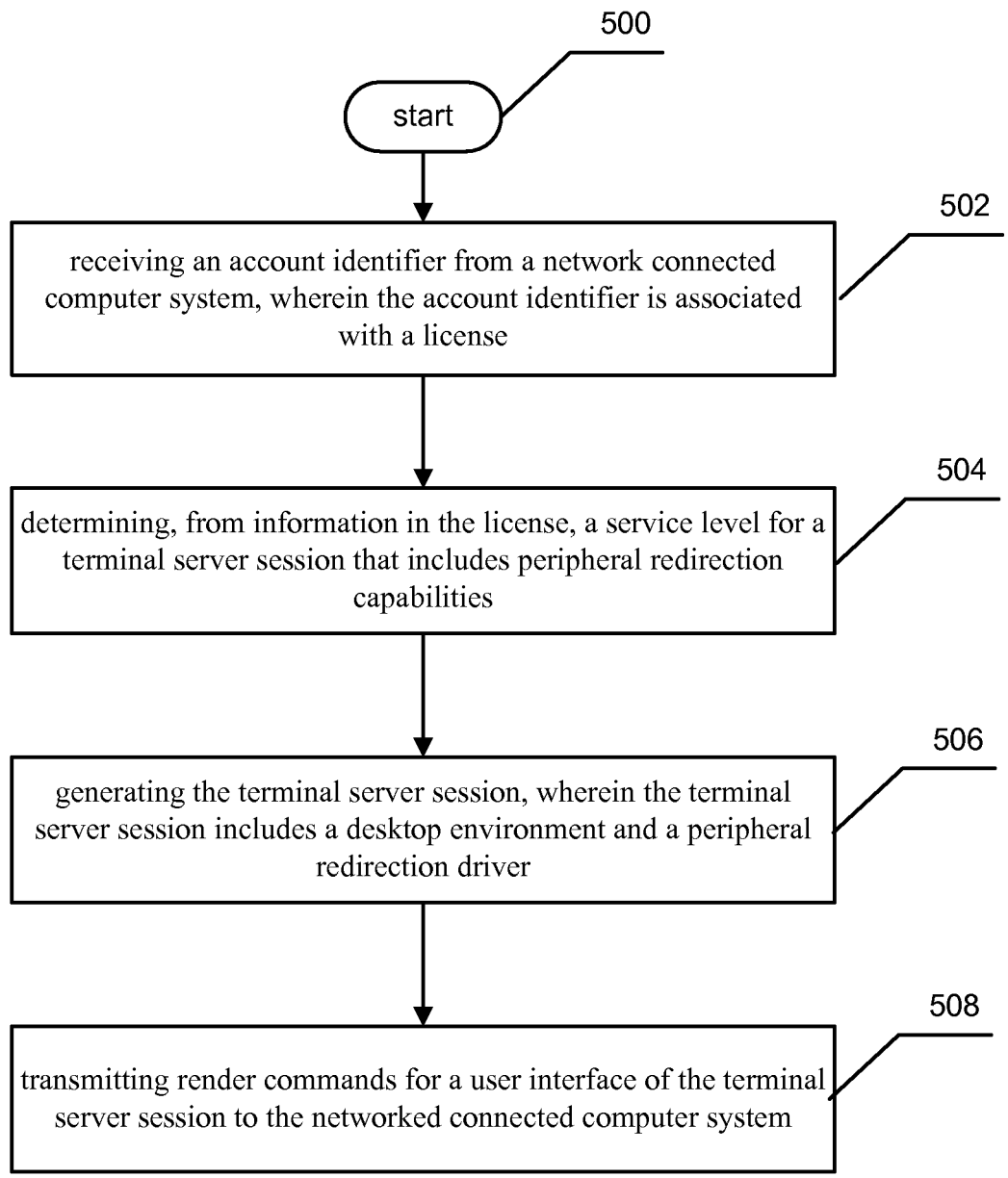
FIG. 5 depicts a flowchart depicting operational procedures for a remote computing method.

Referring now to FIG. 5, it depicts operational procedures related to customizing sessions. In an example embodiment of the present disclosure the operational procedures can be implemented by circuitry of a computer system. Referring to FIG. 5, operation 500 begins the operational procedure and operation 502 illustrates receiving an account identifier from a network connected computer system, wherein the account identifier is associated with a license. For example, and referring to FIG. 2, in an example embodiment of the present disclosure a session can be initialized by a session manager 216 and a user interface for a logon process can be generated by the GDI 246. In this example the remote display subsystem 254 can be configured to instantiate a display driver that can receive commands from the GDI 246 to draw the user interface. The commands can be routed from the display driver to the client 201 via transport logic 210. In this example the transport logic 210 of the server 204 can be configured to receive an account identifier from the client 201. The transport logic 210 can pass a copy of the account identifier to the engine 212 and the engine 212 can pass the account identifier to a license database 222. The license database 222 can in this example be configured to determine which license is associated with the account identifier and transmit a copy of the license to the engine 212.

Continuing with the description of FIG. 5, operation 504 illustrates determining, from information in the license, a service level for a terminal server session that includes peripheral redirection capabilities. For example, and referring to FIG. 1 and FIG. 2, a configuration manager 224 of an engine 212 can in this example be configured to determine a service level for a session from information stored in the license. In this embodiment of the present disclosure the license can include information that enables peripheral redirection. For example, in an embodiment the information in the license can be schematized and the configuration manager 224 can in this example include a parser. In this example embodiment the license could be a file written in XML and could define a service level by including a list of features associated with information that identifies whether they are enabled or disabled. For example, a license can include attributes related to peripheral redirecting such 'redirecting'=1 or in other embodiments the attributes could be nested within the peripheral redirecting attribute and include, for example, 'printer'=1, 'mp3 player'=0, etc. In this example the configuration manager 224 can be configured to instantiate redirecting drivers for the session based on the information in the license.

In an example embodiment the peripheral devices can include, but are not limited to mp3 players, local drives, digital cameras, printers, at the like. In this example embodiment when the client 201 requests a session it can transmit a list that identifies the physically attached peripheral devices to the server 204. In this example embodiment the engine 212 can receive the list and the configuration manager 224 can determine whether the license enables peripheral device redirection and/or determine whether the license allows for the peripheral devices in the table to be redirected. In an embodiment peripheral device redirection for all supported peripheral devices can be enabled or disabled together, e.g., one attribute in or associated with the license could enable/disable all peripheral devices, or in other embodiments different levels of service may enable device redirection for different types of devices, e.g., mp3 player may be enabled for 'gold' licenses or above. For example, a 'silver' license can be processed by the configuration manager 224 and a determination can be made to enable printing redirection and local drive redirection, however plug and play support for an mp3 play may be disabled.

Continuing with the description of FIG. 5, operation 506 illustrates generating the terminal server session, wherein the terminal server session includes a desktop environment and a peripheral redirection driver. The configuration manager 224 in this example can interface with the redirecting subsystem 258 once it determines that a peripheral redirection driver is enabled for this session. In an embodiment the configuration manager 224 can expose a table that lists enabled peripherals and the redirecting subsystem 258 can connect to the configuration manager 224 determine which peripheral redirection driver to generate for the session; and instantiate redirection drivers to support the peripheral devices. When a session is generated that includes peripheral redirection drivers, the session core 244 in this example can detect the redirecting drivers and determine that the peripheral devices are connected and accessible to the server 204, e.g., the redirecting drivers can emulate the presence of peripherals. The session core 244 can then in this example generate a graphical representation of the emulated peripheral in the desktop environment. In this example, if a user manipulates the graphical representation of the emulated peripheral the session core 244 can send an access request to the redirecting drivers. The redirecting drivers and receive the request and format a message, e.g., one or more packets of information, for the peripheral device of the client 201 and send it to the client 201.

Continuing with the description of FIG. 5, operation 508 illustrates transmitting draw commands for a user interface of the terminal server session to the networked connected computer system. In an example embodiment of the present disclosure after a customized session is generated by the engine 212 a signal indicative of the user interface for the session can be generated by the GDI 246 and transmitted to the remote display subsystem 254. In this example the GDI 246 can be configured to format commands to render images for the session into commands supported by the remote display subsystem 254. The remote display subsystem 254 can then be configured to transmit the commands to the client 201 via the appropriate protocol stack instance of the transport logic 210.

Figure 6:
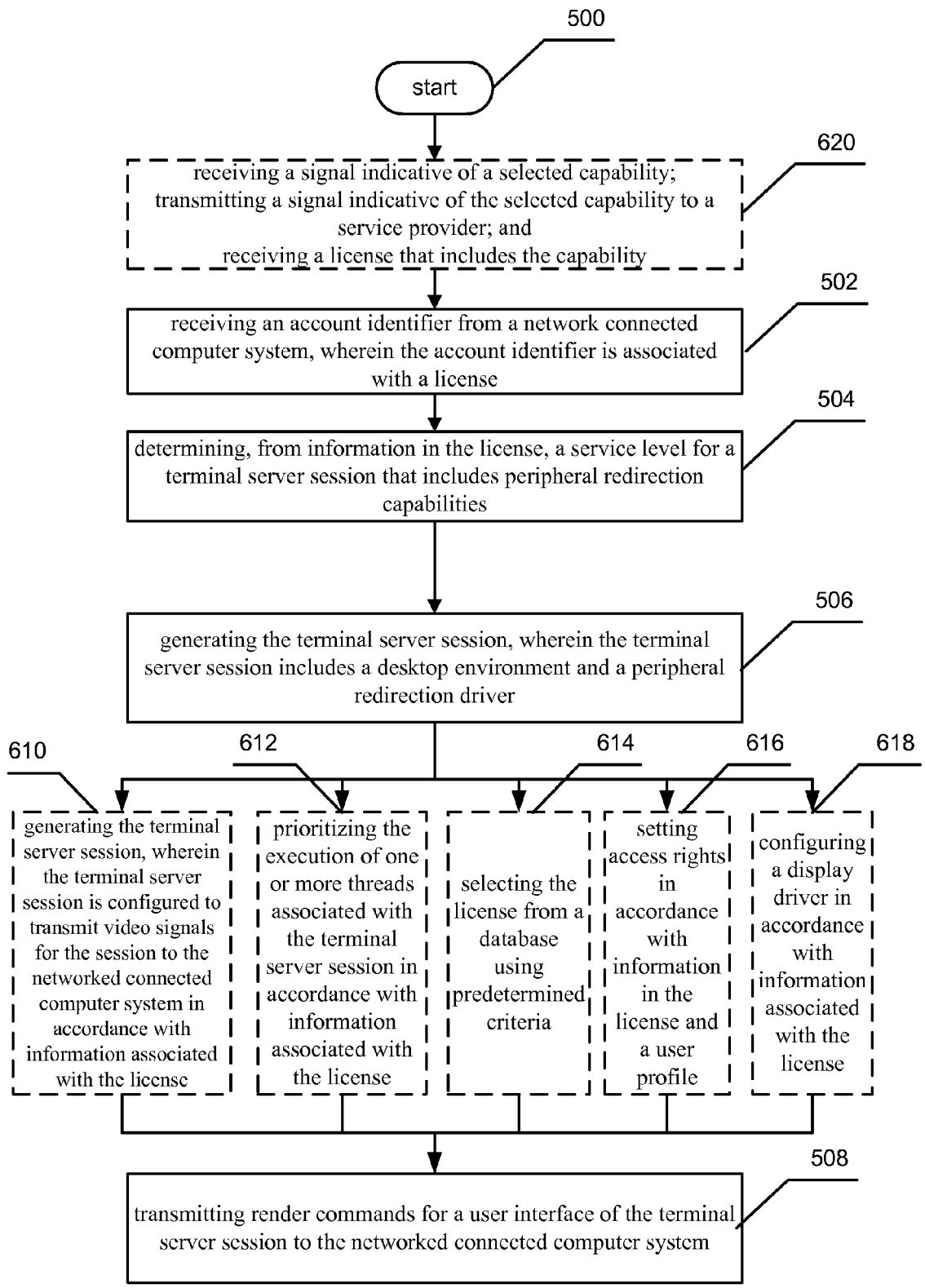
FIG. 6 depicts an alternative embodiment of the operational flowchart of FIG. 5.
Figure 7:
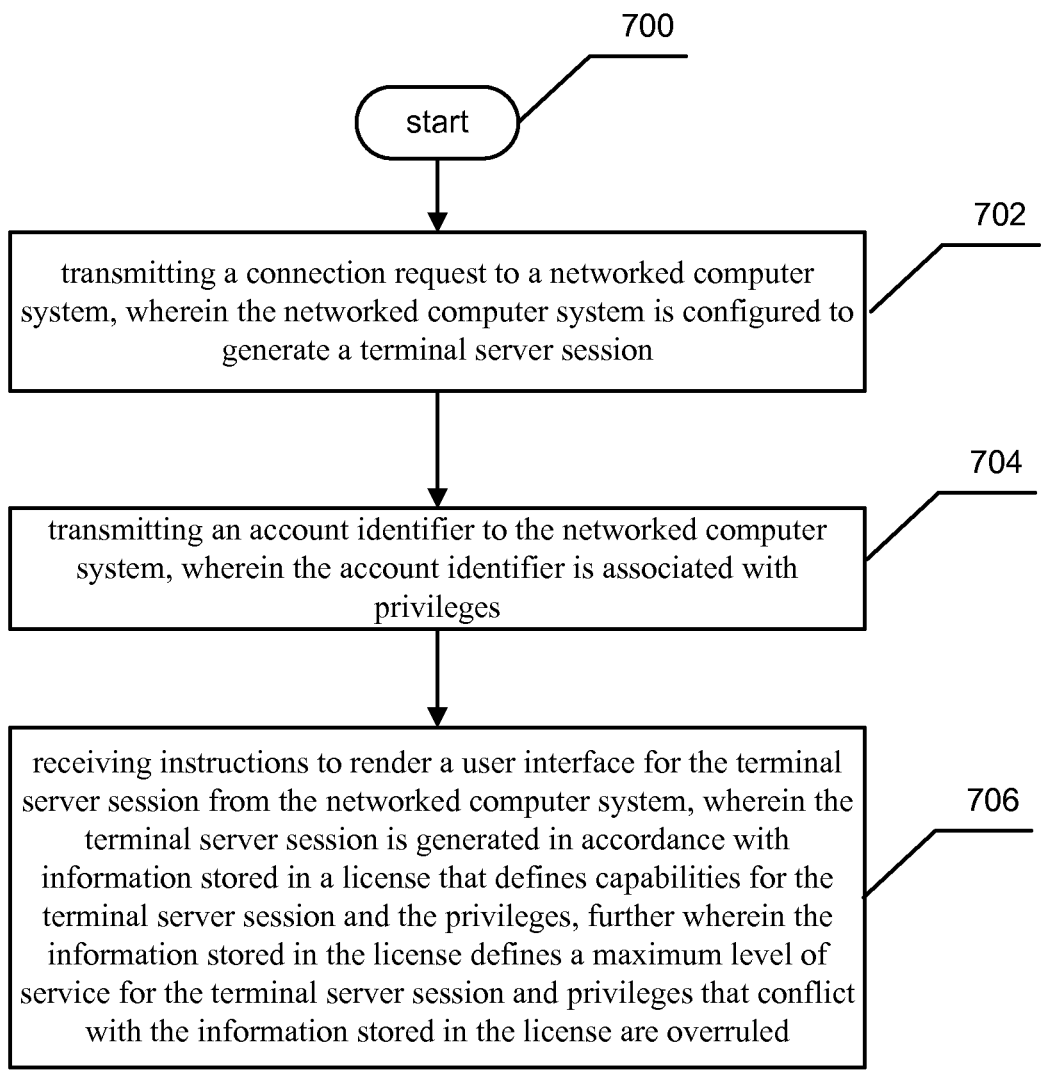
FIG. 7 depicts a flowchart depicting operational procedures for thin-client computing.

Referring now to FIG. 6, it depicts an alternative embodiment of the operational procedure 700 of FIG. 7 including additional operations 610, 612, 614, 616, 618,. Regarding operation 610 it depicts generating the terminal server session, wherein the terminal server session is configured to transmit video signals for the session to the networked connected computer system in accordance with information associated with the license. In example embodiments of the present disclosure after a customized session is generated by the engine 212, a signal indicative of the user interface for the session can be captured by the display driver and transmitted via the transport logic 210 to the client 201 by a network adaptor. For example, in certain embodiments of the present disclosure the display driver can include different interfaces that draw graphics and play video. In this example, the display driver can be configured to distinguish between the two and generate commands indicative of video for clients that have a certain license such as 'gold' or 'platinum'. For example, the display driver in this embodiment can be instantiated by a remote display subsystem 254. When the session is being build the remote display subsystem 254 can interface with the configuration manager 224. Once the signal is received, the remote display subsystem 254 can instantiate a display driver that is configured to capture render commands related to video files and transmit one or more packets indicative of the commands to the client 201. A display driver of the client 201 can be configured to receive the commands and render the video user interface of the session on a display that can be operatively coupled to the client.

Regarding operation 612 it depicts prioritizing the execution of one or more threads associated with the terminal server session in accordance with information associated with the license. For example, in some computer systems the operating system can include a priority driven scheduler that can be configured to preempt executing threads if a thread with a higher priority level is ready to be executed. In an embodiment the resource manager 256 can be configured by the configuration manager 224 to adjust the priority levels of threads that are associated with a certain session space so that a session associated with a 'premium level' license can have threads processed quicker than those of other sessions.

Regarding operation 614 it depicts selecting the license from a database using predetermined criteria. For example, in an embodiment of the present disclosure a license can be selected by the engine 212 based on predetermined criteria such as time of day, day of the week, amount of licenses that can be checked out of the license database 222, amount of sessions currently being maintained, types of licenses available, etc. For example, in an embodiment of the present disclosure a user's experience may change depending on what license is used when they obtain a session. For example, in an embodiment an entity may only purchase one or two 'platinum' level licenses from the service provider 262 that enable, for example, access to movies stored on the server 204. If a user logs on during a busy time they may not be able to check out the 'platinum' level license and would not be able to view movies during their session. In another example, the license database 222 can include a plurality of 'platinum' level licenses, however in this example the licenses may only be checked out on weekends and/or after a certain time of day, e.g., after work hours.

Regarding operation 616 it depicts setting access rights in accordance with information in the license and a policy file. For example, in an embodiment of the present disclosure the license can include access rights for applications, files, registry settings, user preferences, and other resources of the server 204. For example, in an embodiment of the disclosure access rights can be enforced by a security subsystem 250 of the server 204 by checking information in access tokens against access control lists. For example, when a process or thread of a session attempts to gain access, e.g., open, close, delete, modify, an object, e.g., a file, setting, or an application, the thread or process can be authenticated by the security subsystem 250 of the kernel 218. Generally, a thread is authenticated by presenting a token that includes the permissions of the user. The security subsystem 250 can check the token against an access control list associated with the object and determine whether the thread has permission based on a comparison of the information in the token and the access control list. If the security subsystem 250 determines that the thread is authorized then the thread can be allowed to access the object.

In an example embodiment the token can be built from information in the license and information associated with the account identifier. For example, an account identifier can be obtained during a logon process. In this example the local security subsystem 260 can be configured to obtain a copy of a policy file that includes privileges that an administrator has assigned to the account identifier. Once the local security subsystem 260 receives a copy of a policy file it can interface with the configuration manager 224 to merge the access rights associated with the license and the access rights associated with the policy file.

Continuing with the example, in one embodiment the local security subsystem 260 can interface with the configuration manager 224 to merge the access rights in the copy of the policy file with the license information. In an example embedment, the local security subsystem 260 can receive a message from the configuration manager 224 that includes configuration parameters from the license. The local security subsystem 260 can in this example step through each access right from the license and determine whether to modify the information in the copy of the policy file. For example, the local security subsystem 260 can be configured to determine whether each access right in the license is broader than access rights in the copy of the policy file, if an access right in the license is broader than an access right in the copy of the policy file then the access right in the copy of the policy file can be used. If the access right in the license is narrower than the access right in the copy of the policy file, then the copy of the policy file can be modified to include the access right defined by the license. Once the copy of the policy file is updated the local security subsystem 260 can transmit a message the includes the information to the security subsystem 250 so that it can create an access token that encapsulates the set of access rights for the user. After the access token is created, the token can be passed to the local security subsystem 260 and subsequent access rights requested by processes and threads of the session can use the access token to gain access to the resources of the server 204.

In an alternative embodiment the merging operating can be performed by the security subsystem 250 of the kernel 218. For example, the local security subsystem 260 can be configured to send the copy of the policy file to the security subsystem 250. In this example, the security subsystem 250 of the kernel 218 can receive the copy of the policy file and information from the configuration manager 224 that identifies access rights associated with the license. Once the copy of the policy file is updated the security subsystem 250 can be configured to create an access token that encapsulates the set of access rights for the user. After the access token is created, a copy of the token can be passed to the local security subsystem 260 and subsequent access rights requested by processes and threads of the session can use the access token to gain access to the resources of the server 204.

Regarding operation 618 it depicts configuring a display driver in accordance with information associated with the license. For example, in certain embodiments of the present disclosure the license can include information that identifies configuration parameters for a display driver attached to the session. For example, when a session is generated a display driver is loaded in the session that can redirect graphics to the client associate with the session. In this example, the configuration manager 224 send a signal to the remote display subsystem 254 during the session generation process directing it to load a display driver that has certain characteristics. For example, since a user of the client will interact with the session by viewing an image of the session the user experience can be increased by loading display drivers that have different visual features enabled. For example, in an embodiment of the present disclosure the license can set a maximum display resolution for the session such as 800 by 600 pixels for a 'silver' license or 1280 by 1024 pixels for a 'gold' license. In this example a session associated with a 'gold' license will have more screen real-estate than a session associated with a 'silver' license. In another example embodiment the license can identify color quality, e.g., 32 bit color or 16 bit color. In this example a session associated with a 'gold' license will have more and deeper colors than a session associated with a 'silver' license. In yet another example embodiment a license may indicate a level of service that includes a user interface that had features that are intended to be aesthetically pleasing, e.g., the user interface can include graphic translucency effects, animations, etc. For example, in this example a display driver can be loaded that has such aesthetically pleasing features enabled.

Regarding operation 620 it depicts receiving a signal indicative of a selected capability; transmitting a signal indicative of the selected capability to a service provider; and receiving a license that includes the capability. In an example embodiment of the present disclosure a client 201 can receive images from the server 204; draw the images to a bitmap; and render the images on a display that depict one or more capabilities with associated text and a user can select one or more of the capabilities on the display. A signal can be sent to the server 204 that identifies that the user would like a session that includes the capability and a license can be generated for the user by a service provider 262. Once the license is generated, the client 201 can obtain a session from the server 204 that includes the capability. In an embodiment of the present disclosure a business model can be implemented that allows users to select features and a license can be custom built that is priced to reflect the included features.

For example, in one example implementation a session manager 216 can receive a request to generate a session and a process can be instantiated that includes a series of forms listing different capabilities such as plug and play redirection purchasing options, hardware resource level purchasing options, user interface purchasing options, application suite purchasing options, etc. A user interface indicative of the form can then be transmitted to the client 201 than can for example, be depicted alongside the logon screen. The user can either logon using a previously obtained account identifier, or the user can input information about the features they would like to have in there session. After the user has selected one or more features, or alternatively selected a package of features such as a 'silver' package a price total for the license can be presented to the user. In this example the user could for example, enter a credit card number or the like and submit the form. The client 201 can be configured to encrypt the credit card number and the package and transmit a signal to the server 204, or a transaction server that is operatively coupled to the license database 222 (not shown). In this example embodiment the server 204 or the transaction server can include functionality to handle credit card authentication and a packet indicative of the service level can be sent to the service provider 262. In this example the service provider 262 can generate a customized license based on the requested service level and transmit a copy of the license to either the client 201 or the server 204 and a signal can be transmitted back to the client 201 that identifies that the transaction was successful and the license is associated with a specific account identifier. In this example the user can then enter the account identifier into the logon screen and a customized session can be loaded for the user.

Referring now to FIG. 7, it depicts operational procedures related to thin-client computing that can in at least one example embodiment be implemented by computer readable instructions stored in a computer readable storage medium. As illustrated by the operational flowchart, the operational procedure of FIG. 7 includes the example operations 700, 702, 704, and 706. Operation 700 begins the operational procedure and operation 702 illustrates transmitting a connection request to a networked computer system, wherein the networked computer system is configured to generate a terminal server session. For example, and referring to FIG. 2 in an embodiment a network adaptor of a client such as 201 can be configured to transmit a signal, e.g., one or more packets indicative of a request for a terminal server session to a server 204. In this example the server 204 can be configured to receive the signal and create a terminal server session for the client 201. For example, in this embodiment an engine 212 can be configured to receive the connection request and send a signal to a session manager 216 to generate a session. In this example the session manager 216 can initialize a runtime subsystem 240, a session core 244 which can initialize a logon process. Continuing with the example, a redirection display driver can be loaded and the GDI 246 of the session core 244 can generate draw commands indicative of the user interface for the logon process and the redirection display driver can transmit a signal indicative of the draw commands for the logon process to the client 201.

Continuing with the description of FIG. 7, operation 704 depicts transmitting an account identifier to the networked computer system, wherein the account identifier is associated with privileges. For example and in addition to the previous example the client 201 can receive a signal indicative of a logon screen from the server 204 and render the logon screen on a display operatively coupled to the client 201. In this example the client 201 can receive draw commands indicative of the logon screen from a remote display subsystem 254 via a protocol stack instance of transport logic 210 of the server 204. A display driver of the client 201 in this example can draw images associated with the draw commands to a bitmap stored in memory and render some or all of the images of the bitmap on the display. In this example the images can include a field to input an account identifier. In this example the client 201 can be configured to track user input, e.g., mouse movement information, mouse clicks, and keyboard input, etc. A user of the client 201 can input an account identifier and the client 201 can transmit a signal indicative of the account identifier to the session core 244 via the protocol stack instance associated with the client's session. In this example privileges can be associated with an account identifier that can be obtained during a session generation process. For example, when a logon process is initialized the session manager 216 can instantiate a basic set of processes that can effectuate a logon process and, for example, a local security subsystem 260. The local security subsystem 260 can receive an account identifier during the logon process and search a database for the account identifier to determine whether the account identifier is valid. In the instance that the combination is valid the local security subsystem 260 can search a policy database that stores policy files that identify registry settings associated with account identifiers and access rights. Once the policy file is obtained the local security subsystem 260 can interface with the configuration manager 224 to determine whether any of the privileges should be modified in view of information in the license.

Continuing with the description of FIG. 7, operation 706 depicts receiving instructions to render a user interface for the terminal server session from the networked computer system, wherein the terminal server session is generated in accordance with information stored in a license that defines capabilities for the terminal server session and the privileges, further wherein the information stored in the license defines a maximum level of service for the terminal server session and privileges that conflict with the information stored in the license are overruled. For example and in addition to the previous example the client 201 can be configured to render a user interface for a terminal server session. In this example the client 201 can receive draw commands indicative of the a customized terminal service session from the remote display subsystem 254 via a protocol stack instance of transport logic 210 of the server 204. A display driver of the client 201 in this example can draw images associated with the draw commands to a bitmap stored in memory and render some or all of the images on a display. In this example the terminal server session can include a service level defined by information stored in a license and the privileges associated with the account identifier. As depicted by FIG. 2 the session can be generated by the engine 212 in accordance with support from various subsystems that are configured to effectuate a service level for the session. For example, the configuration manager 224 in an embodiment can include an application program interface that is accessible to the various subsystems that support the terminal server. In this example, the subcomponents can receive a signal that indicates that a new session is being generated and connect to the configuration manager 224 via the API and perform operations to customize the session. In another specific example the engine 212 can be configured to send configuration messages to each subsystem that supports terminal server sessions. In this example, the configuration manager 224 can be configured to generate configuration signals for each subsystem and transmit the signals to APIs of the subsystems. Each subsystem can be configured to receive the configuration information and perform operations to customize the session.

In an example embodiment the capabilities of the session can define a maximum level of rights and if privileges provide greater rights then they can be overruled by the configuration manager 224. In this example, the license can be thought of as setting a maximum service level that can be scaled back by configuring privileges. In this example, if a right defined in the policy file is broader than a similar right in a license the session can be generated with the right defined in the license. If on the other hand a right defined in the policy file is narrower than a similar right in the license, the session can be generated with the right defined by the policy file. In this embodiment, the service provider 262 can use the license to control how the server 204 is used, e.g., if an entity purchases a 'bronze' license an administrator can not configure the server 204 to provide 'platinum' services. For example, different license types may have different price points depending on the capabilities associated with them.

Figure 8:
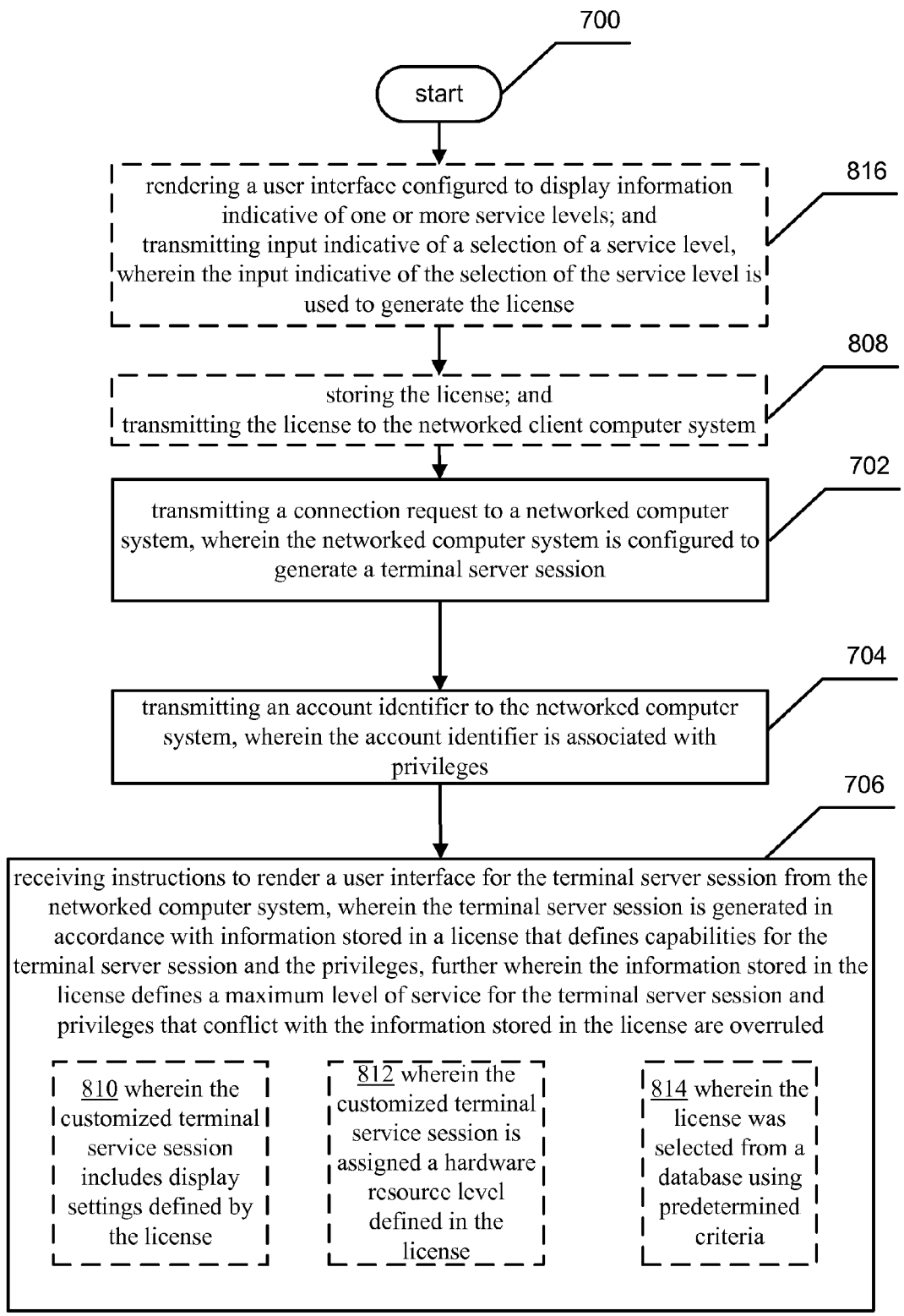
FIG. 8 depicts an alternative embodiment of the operational flowchart of FIG. 7.

Referring now to FIG. 8, it illustrates and alternative embodiment including additional example operations and further refinements to the operational procedure 700 of FIG. 7. Referring now to operation 808 it depicts storing the license; and transmitting the license to the networked client computer system. For example, in an embodiment of the present disclosure the license can be stored in memory of the client 201. In this embodiment the client 201 can store a license that can be encrypted using public key cryptography techniques. In this example the client 201 can transmit a copy of the license to the transport logic 210 which can be configured to forward the license to the engine 212. The engine 212 can then in this example decrypt the license using a private key for example. In this example embodiment the client 201 can be configured to transmit a copy of the license to the transport logic 210 during, for example, a request for a session. The configuration manager 224 can in this example receive a copy of the license and parse it. The configuration manager 224 could then store the information in a table and expose the information via an API to various subsystems such as the redirection subsystem 258, the remote display subsystem 254, the security subsystem 250, etc. In this example when a user interface indicative of the logon is transmitted to the client 201 a maximum level of service has already been defined by the license and the level of service can be refined by information stored in a policy file. For example, the remote display subsystem 254 can instantiate a display driver that has certain qualities, e.g., can generate a certain pixel range, and the privileges can restrict how this display driver is modified, e.g., by restricting a user's ability to change the display resolution from 800 by 600 pixels to 1280 by 1024 pixels.

Referring now to refinement 810 it illustrates the operational procedure 700 of FIG. 7, wherein the customized terminal service session includes display settings defined by the license. For example, in an embodiment of the present disclosure the display settings of the session can be set by information stored in the license. For example, when a session is generated a display driver is loaded by the remote display subsystem 254 in the session that can redirect graphics to the client 201 associate with the session. In this example, the configuration manager 224 send a signal to the remote display subsystem 254 during the session generation process directing it to load a display driver that has certain characteristics. For example, since a user of the client 201 will interact with the session by viewing an image of the session the user experience can be increased by loading display drivers that have different visual features enabled. For example, in an embodiment of the present disclosure the license can set a maximum display resolution for the session such as 800 by 600 pixels for a 'silver' license or 1280 by 1024 pixels for a 'gold' license. In this example a session associated with a 'gold' license will have more screen real-estate than a session associated with a 'silver' license. In another example embodiment the license can identify color quality, e.g., 32 bit color or 16 bit color. In this example a session associated with a 'gold' license will have more and deeper colors than a session associated with a 'silver' license. In yet another example embodiment a license may indicate a level of service that includes a user interface that had features that are intended to be aesthetically pleasing, e.g., the user interface can include graphic translucency effects, animations, etc. For example, in this example a display driver can be loaded that has such aesthetically pleasing features enabled.

Referring now to refinement 812 it illustrates the operational procedure 700 of FIG. 7, wherein the customized terminal service session is assigned a hardware resource level defined in the license. For example, in an embodiment of the present disclosure the license can include information that identifies a hardware resource level for the session. In this example embodiment the configuration manager 224 can determine an amount of system resources for the session and communicate the information to a resource manager 256 of the kernel 218 and/or the session manager 216 depending on what subsystem is called to set the resource level associated with the license, e.g., the resource manager 256 can receive information to prioritize threads whereas the session manager 216 can receive information to assign memory address to the session. In an example embodiment the hardware resources can include a size of real and/or virtual memory that is reserved for the session space. In this example the configuration manager 224 can send information that defines a memory size to the session manager 216 and the session manager 216 can be configured to generate a session that includes a certain amount of virtual memory and/or real memory. In another example embodiment the hardware resource level can define a priority level for processing threads associated with the session space. In yet another example embodiment the hardware resource level can be associated with a level of priority related to access to hardware components of the server 204 such as hard disks, CD-ROMs, floppy disk drives, serial ports, and parallel ports, and/or priority access to the registry, the paging file, system services, and other global objects and resources.

In an embodiment the resource manager 256 can be configured by the configuration manager 224 to adjust the priority levels of threads that are associated with a certain session space so that a session associated with a 'premium level' license so that its threads can have a higher priority than those of other sessions. For example, when the session is generated the configuration manager 224 can identify a priority level associated with the license and send a message to the resource manager 256 of the server 204. The resource manager 256 can store a table that identifies the session identifier and a service level. The operating system 214 in this example can include a priority driven scheduler that can have access to the table. In the event that a thread associated with a session identifier stored in the table sets a ready flag the scheduler can preempt execution of a thread if the executing thread has a lower priority level.

In another example embodiment of the present disclosure the configuration manager 224 can be configured to receive a license that locks down the server 204 by setting a restriction on the number of user space applications that can be executed in the session space of a session. In this example embodiment the configuration manager 224 can send a signal to the resource manager 256 to only instantiate a certain number of processes for the session. For example, in an embodiment of the present disclosure a license may indicate a certain level of service by including an attribute such as 'application=3'. In this example embodiment, the attribute application can indicate that sessions associated with this license can only allow the user to execute 3 user space applications at a given time. The configuration manager 224 in this example can communicate this information to the resource manager 256 where it can be stored in a table that identifies the maximum number of applications that can concurrently execute and the number of user space applications that are executing in the session space of the session. When a request is received to generate a process for a user space application, the resource manager 256 can check the table to determine whether the maximum level has been reached. In the instance that the maximum level is reached the resource manager 256 can generate an error message that can be transmitted to the client 201, otherwise the resource manager 256 can execute a process for the user space application.

In another example embodiment of the present disclosure the configuration manager 224 can transmit a signal that sets the restriction level for applications to the runtime subsystem 240. The runtime subsystem 240 in this example can be configured to store the information in a table that identifies the maximum number of applications that can concurrently execute and list the number of user space applications that are executing in the session space of the session. When a request is received to generate a process for a user space application, the runtime subsystem 240 can check the table to determine whether the maximum level has been reached. In the instance that the maximum level is reached the runtime subsystem 240 can generate an error message that can be transmitted to the client 201, otherwise the runtime subsystem 240 can submit a request to generate a process for the application to the resource manager 256 of the kernel 218.

Referring now to refinement 814 it illustrates the operational procedure 700 of FIG. 7, wherein the license was selected from a database using predetermined criteria. For example, in an embodiment of the present disclosure a license can be selected by the engine 212 based on predetermined criteria such as time of day, day of the week, amount of licenses that can be checked out of the license database 222, amount of sessions currently being maintained, types of licenses available, etc. For example, in an embodiment of the present disclosure a user's experience may change depending on what license is used when they obtain a session. For example, in an embodiment an entity may only purchase one or two 'platinum' level licenses from the service provider 262 that enable, for example, access to movies stored on the server 204. If a user logs on during a busy time they may not be able to check out the 'platinum' level license and would not be able to view movies during their session. In another example, the license database 222 can include a plurality of 'platinum' level licenses, however in this example the licenses may only be checked out on weekends and/or after a certain time of day, e.g., after work hours. In this example a user logging on during business hours may only have access to a license that enables access to resources associated with work. In this example embodiment the engine 212 can maintain a table that identifies different predetermined criterion and the types of licenses that can be made available if such criterion exist. For example, the engine 212 can receive a request to generate a session. In this example the engine 212 may access the license database 222 and determine that the account identifier associated with the request is associated with a 'platinum' level license. The engine 212 can then request a platinum license from the license database 222. If however a 'platinum' level license is not available, e.g., they are all checked out by other people that are associated with 'platinum' level licenses, the engine 212 can obtain a 'gold' license instead and use it to build a session or send a message to the client 201 that states that a 'platinum' license is not available at the moment.

Referring now to operation 816 it illustrates rendering a user interface configured to display information indicative of one or more service levels; and transmitting input indicative of a selection of a service level, wherein the input indicative of the selection of the service level is used to generate the license. In an example embodiment of the present disclosure a client 201 can receive images from the server 204; draw the images to a bitmap; and render the images on a display that depict one or more different service levels and text that describes the different capabilities of each service level and a user can select a service level. For example, in an embodiment of the present disclosure a logon screen can be rendered by a display driver of the client 201. In this example the logon screen can include a tab that when selected renders a display that depicts different service levels for purchase such as a 'silver' service level, 'gold', etc. Each service level in this example can be associated with text that describes the different features of each license so that a user can compare the different service levels and determine which one to purchase. In this example user input indicative of a selection can be received a price total for the license can be presented to the user. In this example the user could for example, enter a credit card number or the like and submit the form. The client 201 can be configured to encrypt the credit card number and the package and transmit a signal to the server 204, or a transaction server that is operatively coupled to the license database 222 (not shown). In this example embodiment the transaction server can include functionality to handle credit card authentication and generate a customized license based on the requested service level. In this example embodiment the newly generated license can be stored in the license database 222, and a signal can be transmitted back to the client 201 that identifies that the transaction was successful and that license was successfully associated with an account identifier. In this example the user can then enter the account identifier into the logon screen and a customized session can be loaded for the user. In other example embodiments the license can be generated and transmitted to the client 201 where it can be stored in an encrypted format. When the user enters an account identifier a copy of the license can be transmitted to the server 204 and a customized session can be loaded for the user.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A remote computing method, the method comprising:
   receiving, by a computer system, a request to start a terminal service session from a client;
   determining from a license purchased from a license provider that the license indicates that peripheral device redirection capabilities are disabled for terminal service sessions generated in association with the license;
   determining, from an account identifier, that peripheral device redirection capabilities are enabled for terminal service sessions generated in association with the account identifier;
   disabling a peripheral redirection driver in response to a determination that peripheral device redirection capabilities associated with the license are in conflict with peripheral device redirection capabilities associated with the account identifier, the peripheral redirection driver configured to enable a terminal service session to control peripheral devices physically attached to the client;
   generating a customized terminal service session, wherein the terminal session is customized by loading a peripheral redirection driver when said peripheral redirection driver is not disabled and without loading a peripheral redirection driver when the peripheral redirection driver is disabled; and
   transmitting draw commands for a user interface of the customized terminal service session to a client.

2. The method of claim 1, further comprising:
   generating the customized terminal service session, wherein the customized terminal service session includes access rights for accessing files on the computer system defined by the license.

3. The method of claim 1, further comprising:
   generating the customized terminal service session, wherein the customized terminal service session includes a display resolution set in accordance with display settings defined by the license.

4. The method of claim 1, further comprising:
   associating threads associated with the customized terminal service session with a priority level defined in the license, a thread priority level useable by a scheduler to determine when to schedule threads to run on a processor.

5. The method of claim 1, further comprising:
   disabling graphics translucency effects for the customized terminal service session in accordance with information associated with the license.

6. The method of claim 1, further comprising:
   receiving a signal indicative of a selected level of service;
   transmitting a signal indicative of a selected capability to the license provider; and receiving the license.

7. The method of claim 1, further comprising:
   selecting the license from a database in response to determining that all premium level licenses are checked out.

8. A computer system for customizing remote computing sessions, the system configured to communicate with a license database and a networked connected computer system operable to display a desktop environment generated at the computer system, the system comprising:
   a processor;
   a memory coupled to the processor, the memory including instructions that upon execution cause the processor to:
   receive an account identifier from a network connected computer system;
   receive a policy file associated with the account identifier, wherein the policy file includes file system access rights;
   receive a license, wherein the license indicates that peripheral devices attached to the network connected computer system are made accessible to the computer system; and
   generate a terminal server session on the computer system, the terminal server session configured to control a peripheral device attached to the network connected computer system when the license indicates that peripheral devices attached to the network connected computer system are made accessible to the computer system by loading a redirection driver for use by the terminal server session, wherein the terminal server session includes a desktop environment.

9. The system of claim 8, wherein the instructions that upon execution cause the processor to generate the terminal server session further comprise instructions that upon execution cause the processor to:
   generate the terminal server session, wherein the terminal server session is configured to transmit video signals for the session to the networked connected computer system in accordance with information associated with the license.

10. The system of claim 8, wherein the instructions that upon execution cause the processor to generate the terminal server session further comprise instructions that upon execution cause the processor to:
    prioritize the execution of one or more threads associated with the terminal server session in accordance with information associated with the license.

11. The system of claim 8, wherein the memory further comprises instructions that upon execution cause the processor to:
    select the license from a database using predetermined criteria.

12. The system of claim 8, wherein the memory further comprises instructions that upon execution cause the processor to:
    configure a display resolution of a display driver in accordance with information associated with the license.

13. The system of claim 8, wherein the memory further comprises instructions that upon execution cause the processor to:
    receive a signal indicating a selection of a premium license; and
    transmit a signal indicative of the selected premium license to the license database; and
    circuitry for receiving a premium license.

14. A computer readable storage device including instructions stored thereon that upon execution by a processor of a computer system cause the computer system to:
    receive, from a client, a request to start a session on the computer system without a license;
    disable graphics translucency effects and peripheral device redirection drivers, the peripheral redirection drivers usable by the session running on the computer system, the redirection drivers configured to enable the session to control peripheral devices physically attached to the client when enabled;

log a user account associated with an account identifier into the session, the session having graphics translucency effects and peripheral device redirection drivers disabled; and send a graphical user interface indicative of the session to the client.

15. The computer readable storage device of claim 14, wherein the computer-readable storage device further comprises instructions that upon execution cause the computer system to:

generate a logon token from information associated with the account identifier, the logon token encapsulating access rights for a user account.

16. The computer readable storage device of claim 14, wherein the computer-readable storage device further comprises instructions that upon execution cause the computer system to:

set a display resolution to a display resolution defined by the license when a license is associated with the session.

17. The computer readable storage device of claim 14, wherein the computer-readable storage device further comprises instructions that upon execution cause the computer system to:

set thread priority information for the session to a thread priority level defined in the license when a license is associated with the session, the thread priority level useable by a scheduler to determine when to schedule threads to run on a processor.

18. The computer readable storage device of claim 14, wherein the instructions that upon execution by the processor of the computer system cause the computer system to receive information indicating that premium level licenses are unavailable further comprise instructions that upon execution cause the computer system to:

receive information indicating that premium level licenses are unavailable to a user account associated with the account identifier.

19. The computer readable storage device of claim 14, wherein the instructions that upon execution by the processor of the computer system cause the computer system to receive information indicating that premium level licenses are unavailable further comprise instructions that upon execution cause the computer system to:

receive information indicating that all premium level licenses are currently checked out.

\* \* \* \* \*